UNITED STATES PATENT OFFICE.

CHAUNCEY SPEAR, OF HOPEWELL, NEW YORK, ASSIGNOR TO HIMSELF, W. MARKS, G. L. ARCHER, AND W. L. PARKHURST.

IMPROVED COMPOSITION FOR ROOFING, &c.

Specification forming part of Letters Patent No. 57,400, dated August 21, 1866.

*To all whom it may concern:*

Be it known that I, CHAUNCEY SPEAR, of Hopewell, in the county of Ontario and State of New York, have invented a new and Improved Composition for Roofing and Paving; and I do hereby declare the following to be a full, clear, and exact description thereof.

I mix the following ingredients to form my composition: Two parts of peat, two of white or brick clay, and one of gypsum are incorporated together, and three parts of the above are mixed with one of gas-tar, or the residuum of petroleum. In lieu of the peat, coal-dust or pulverized stone-coal or clinkers may be employed with two parts of clay and three parts of that mixture, mixed, as in the other composition, with one part of gas-tar. The peat or coal-dust is used as an absorbent of the gas-tar, and thus prevents the latter from diffusing itself into the substance to which it may be applied. Vegetable mold or muck would answer the same purpose, but would not become as hard.

For roofing purposes the proportions of the materials employed would have to be varied in order to render the compound more plastic.

Having thus fully described my invention, what I claim as new, and desire to secure by Letters Patent, is—

The composition for roofing, paving, or other purposes, consisting of peat, gypsum, coal-ashes, or vegetable mold, combined with clay and tar, substantially in the proportions set forth.

The above specification of my improved composition for roofing and other purposes signed this 2d day of July, 1866.

CHAUNCEY SPEAR.

Witnesses:
ALEX. A. C. KLAUCKE,
CHAS. A. PETTIT.